(12) United States Patent
Castro et al.

(10) Patent No.: US 10,996,137 B2
(45) Date of Patent: May 4, 2021

(54) OPTICAL FIBER TERMINATION USING A REFERENCE SOURCE

(71) Applicant: Panduit Corp., Tinley Park, IL (US)

(72) Inventors: Jose M. Castro, Naperville, IL (US);
Richard J. Pimpinella, Frankfort, IL (US); Yu Huang, Orland Park, IL (US);
Bulent Kose, Burr Ridge, IL (US);
Asher S. Novick, Chicago, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 16/725,157

(22) Filed: Dec. 23, 2019

(65) Prior Publication Data

US 2020/0141833 A1 May 7, 2020

Related U.S. Application Data

(63) Continuation of application No. 15/801,644, filed on Nov. 2, 2017, now Pat. No. 10,514,511.

(51) Int. Cl.
*G01M 11/00* (2006.01)
*G02B 6/38* (2006.01)

(52) U.S. Cl.
CPC .......... *G01M 11/30* (2013.01); *G01M 11/35* (2013.01); *G01M 11/37* (2013.01); *G02B 6/385* (2013.01); *G02B 6/3801* (2013.01)

(58) Field of Classification Search
None
See application file for complete search history.

(56) References Cited

U.S. PATENT DOCUMENTS

| | | | |
|---|---|---|---|
| 4,391,517 A * | 7/1983 | Zucker | G01M 11/35 250/227.11 |
| 5,406,374 A | 4/1995 | Shimada et al. | |
| 6,677,591 B1 * | 1/2004 | Kim | G01M 11/0278 250/330 |
| 6,816,661 B1 | 11/2004 | Barnes et al. | |
| 6,931,193 B2 | 8/2005 | Barnes et al. | |
| 7,192,195 B2 | 3/2007 | Turner | |
| 7,680,384 B2 | 3/2010 | Billman et al. | |
| RE42,094 E | 2/2011 | Barnes et al. | |
| 8,094,988 B2 | 1/2012 | Billman et al. | |

(Continued)

FOREIGN PATENT DOCUMENTS

WO 2007078551 A2 7/2007
WO 2013177685 A1 12/2013

*Primary Examiner* — Michelle R Connelly
(74) *Attorney, Agent, or Firm* — Christopher S. Clancy; James H. Williams; Christopher K. Marlow

(57) ABSTRACT

Examples disclosed herein illustrate systems and methods to determine and evaluate the quality of mechanical splices of optical fibers using insertion loss estimation. In at least some of the disclosed systems and methods, an optical fiber termination system may include a reference fiber coupling a light source and a stub fiber of a fiber optic connector, a digital camera sensor and lens to capture images of scattered light emanating from a portion of the fiber optic connector and a portion of the reference fiber both in a field of view (FOV) of the digital camera sensor, and a processor. The processor may analyze digital images of scatter light emitted from at least a portion of the fiber optic connector and the reference fiber to estimate insertion loss at the fiber optic connector.

5 Claims, 8 Drawing Sheets

(56) References Cited

U.S. PATENT DOCUMENTS

| | | |
|---|---|---|
| 8,718,433 B2 | 5/2014 | Billman et al. |
| RE45,482 E | 4/2015 | Barnes et al. |
| RE46,270 E | 1/2017 | Barnes et al. |
| 2011/0122401 A1* | 5/2011 | Caveney ................. A61P 25/00 356/73.1 |

* cited by examiner

OPTICAL FIBER TERMINATION USING A REFERENCE SOURCE

CROSS REFERENCE TO RELATED APPLICATIONS

This application is a continuation of U.S. patent application Ser. No. 15/801,644, filed Nov. 2, 2017, which issued as U.S. Pat. No. 10,514,511, issued on Dec. 24, 2019, the subject matter of which is hereby incorporated by reference in its entirety.

BACKGROUND

When working in the field of fiber optics, operators often establish connections between non-connectorized ends of optical fibers or fiber ribbons. This is generally referred to as splicing, and it may involve creating temporary or permanent joints between two fibers.

In certain instances, the two fibers are precisely aligned and then fused together using localized intense heat often times created with an electric arc. This is referred to as fusion splicing and is widely employed to create high performance permanent joints between two optical fibers. However, fusion splicer apparatuses are somewhat bulky, expensive and relatively fragile.

Alternatively, the two fibers may simply abut one another in an alignment fixture often referred to as a mechanical splice. The alignment fixture may be an alignment tube or V-groove which receives two ends of separate fibers on either side and has the means of physically securing the fibers. In other instances, the alignment device may be a fiber optic connector with a stub fiber embedded therein made to be connectorized to a field fiber. In this case the field fiber can be terminated utilizing a mechanical splice to the stub fiber inside the connector.

BRIEF DESCRIPTION OF THE DRAWINGS

The following detailed description references the drawings, wherein.

DETAILED DESCRIPTION

Figure 1:
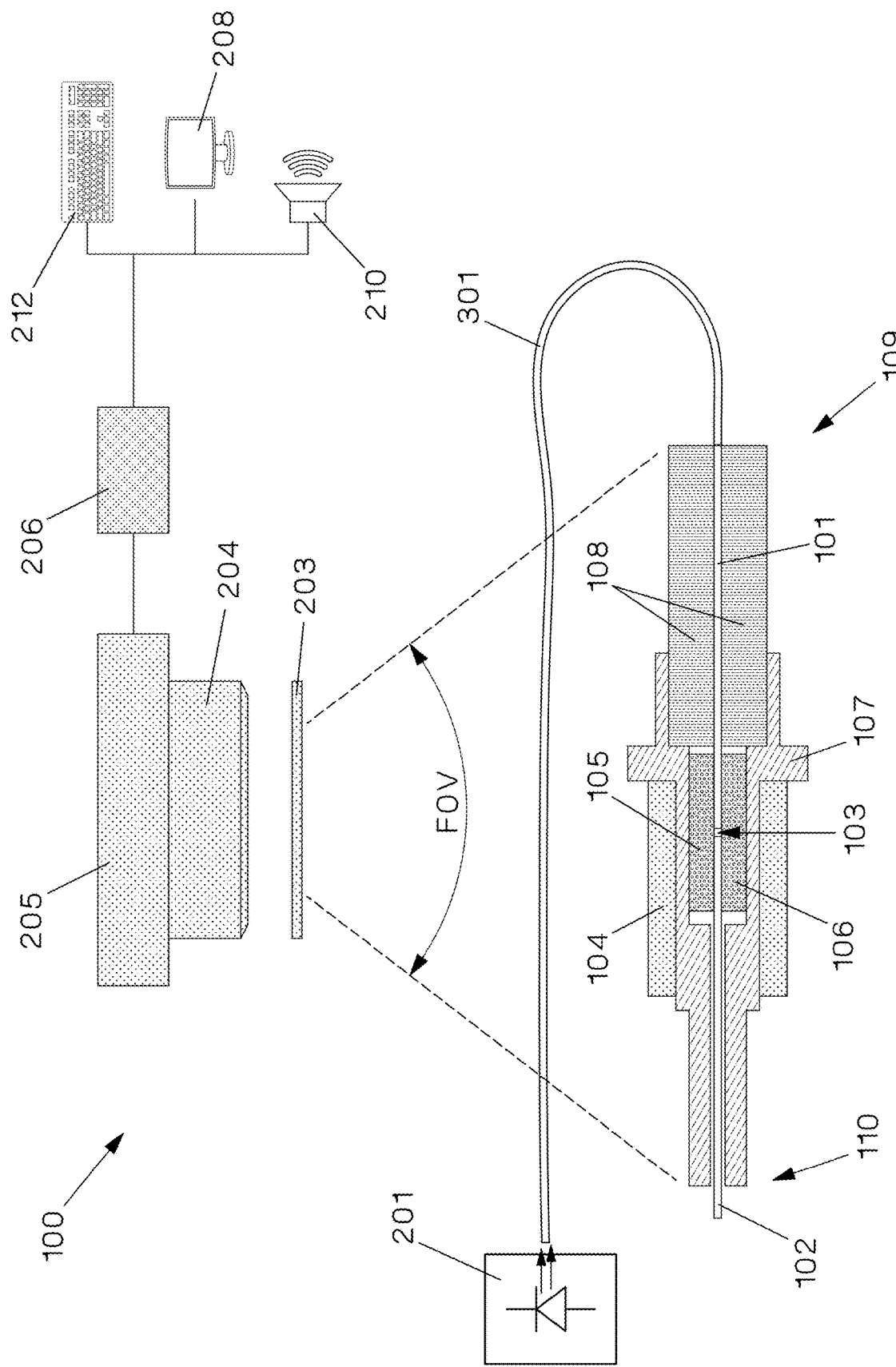
FIG. 1 is an illustration of an example implementation of an optical fiber termination system.

Mechanical splicing often occurs when a field optical fiber is connectorized to a pre-manufactured fiber optic connector with a stub fiber embedded therein. In order to avoid significant loss of signal and minimize the potential reflectance or light leakage within these joints, the fiber(s) need to be properly cleaved, and the operator ensures that there is a precise alignment between the fibers and that transparent gel or optical adhesive applied between the fibers matches the optical properties of the glass. These details are not always easy to detect and/or ensure. There is an uncertainty that can result in insertion loss values that exceed specified limits of the channel, making them unsuitable for the required reaches, data rate, or bit error rate (BER) application. The poor-quality splice joints that result can drive up cost and reduce channel performance.

Examples disclosed herein illustrate systems and methods to determine and evaluate the quality of mechanical splices of optical fibers using insertion loss estimation. In at least some of the disclosed systems and methods, an optical fiber termination system may include a reference fiber coupling a light source and a stub fiber of a fiber optic connector, a digital camera sensor and lens to capture images of scattered light emanating from a portion of the fiber optic connector and a portion of the reference fiber both in a field of view (FOV) of the digital camera sensor, and a processor. The processor may analyze digital images of scatter light emitted from at least a portion of the fiber optic connector and the reference fiber to estimate insertion loss at the fiber optic connector.

Reference will now be made to the accompanying drawings. Wherever possible, the same reference numbers are used in the drawings and the following description to refer to the same or similar parts. It is to be expressly understood, however, that the drawings are for illustration and description purposes only. While several examples are described in this document, modifications, adaptations, and other implementations are possible. Accordingly, the following detailed description does not limit the disclosed examples. Instead, the proper scope of the disclosed examples may be defined by the appended claims.

FIG. 1 is an illustration of an example implementation of an optical fiber termination system 100. As shown in FIG. 1, system 100 may include various components, such as a reference light source 201, optical filter 203, lens 204, digital camera sensor 205, processor 206, display 208, speaker 210, input interface 212, and an optical reference fiber 301. The number and arrangement of these components is an example only and provided for purposes of illustration. Other arrangements and numbers of components may be utilized without departing from the examples of the present disclosure.

Optical fiber termination system 100 may be used to terminate an optical field fiber 102 to a fiber optic connector 109. Various types of fiber optic connectors may be used in optical fiber termination system 100, including, for example, LC connectors, SC connectors, and ST connectors. Fiber optic connector 109 may generally include a ferrule holder 107 with a ferrule 108 positioned at the front end thereof, and a top plank 105 and a bottom plank 106 positioned between the ferrule 108 and a distal end 110 of fiber optic connector 109. Fiber optic connector 109 may also include a stub fiber 101, which may be embedded in fiber optic connector 109 at the time of manufacture. Stub fiber 101 may extend from the outer edge of the ferrule (which can later interface a corresponding adapter (not shown)) to the inner portion of fiber optic connector 109 in the general area of top and bottom planks 105, 106.

Optical fiber termination system 100 may terminate optical field fiber 102 to fiber optic connector 109 by mechanically splicing optical field fiber 102 with stub fiber 101. To mechanically splice stub fiber 101 with optical field fiber 102, optical field fiber 102 may be inserted into fiber optic connector 109 through its distal end 110 and aligned with stub fiber 101. A cam 104 may be activated to clamp optical field fiber 102 and stub fiber 101 in place, forming a stub fiber/optical field fiber interface 103 (also referred to as a splice joint).

In order to ensure that light leakage and reflection are reduced or minimized at splice joint 103, the insertion loss of the connection between optical field fiber 102 and stub fiber 101 at fiber optic connector 109 may be estimated using optical fiber termination system 100 prior to mechanically splicing the fibers together. To estimate the insertion loss, digital camera sensor 205 may capture images of scattered light patterns, and processor 206 may analyze the captured images by, for example, based on the spatial pattern of the scattered light emanating from fiber optic connector 109 relative to the spatial pattern of the scattered light emanating from reference fiber 301. Digital camera sensor 205 may capture the images of scattered light at various stages of optical field fiber 102 insertion into fiber optic connector 109. For example, digital camera sensor 205 may capture images prior to insertion, at various points during insertion, and when optical field fiber 102 is fully inserted into fiber optic connector 109.

Reference light source 201 may be optically coupled to reference fiber 301, which may be optically coupled to stub fiber 101 of fiber optic connector 109. Reference light source 201 may emit light into reference fiber 301. Reference light source 201 may be implemented by a semiconductor laser capable of emitting light having a spectral range within the optical sensitivity of the digital camera sensor 205. For example, the spectral range of reference light source 201 may be between about 700 nm and about 1700 nm. The light may travel along reference fiber 301 and into stub fiber 101. The emitted light may travel from stub fiber 101, across splice joint 103, and into optical field fiber 102. As the emitted light travels along this path, light may be scattered at various points. For example, scattered light may be emitted from reference fiber 301, stub fiber 101, splice joint 103, and field fiber 102.

At least a portion of fiber optic connector 109 may be positioned within the field of view (FOV) of digital camera sensor 205 along with a portion of reference fiber 301. The portion may include various regions of fiber optic connector 109, such as the region including splice joint 103. The scattered light emanating from all the regions of fiber optic connector 109 in the FOV of digital camera sensor 205 and the portion of reference fiber 301 may pass through optical filter 203, focused by lens 204, and captured by digital camera sensor 205. Processor 206 may generate spatial patterns of the scattered light captured by digital camera sensor 205.

Figure 4:
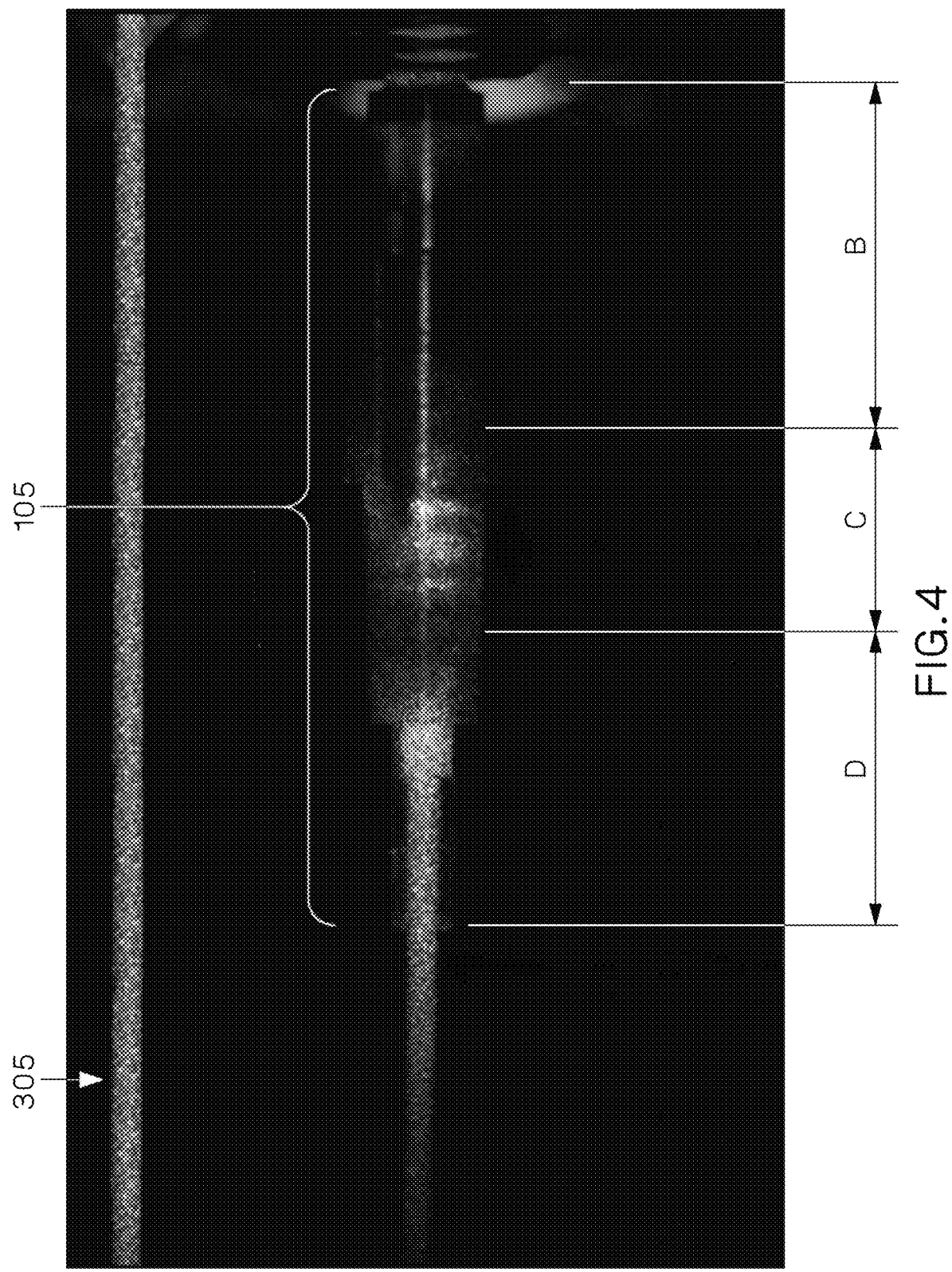
FIG. 4 is an example spatial pattern of scattered light emanating from a portion of a fiber optic connector and a portion of a reference fiber.

FIG. 4 is an example of a spatial pattern of the scattered light from fiber optic connector 109 and reference fiber 301. As shown in FIG. 4, regions B, C, and D of fiber optic connector 109 were captured. Moreover, as shown in FIG. 4, reference fiber 301 and fiber optic connector 109 are located in the FOV of digital camera sensor 205 in such a way that there is not interference or overlap with each other.

Figure 6:
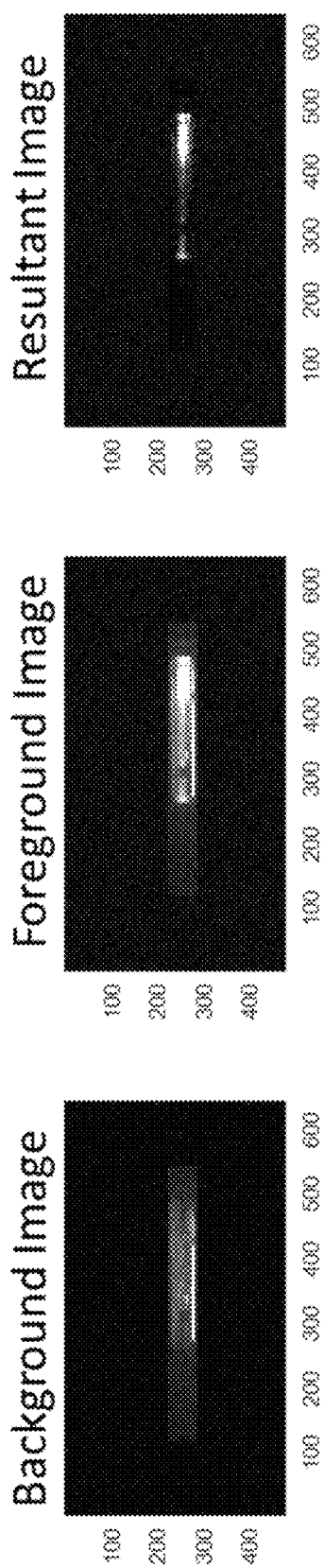
FIG. 6 shows example image captures of scattered light illustrating background correction.

In some implementations, the images captured by digital camera sensor 205 may be background corrected so that optical fiber termination system 100 can be used without a cover or protection from environmental illumination. FIG. 6 illustrates example images captured during a background correction procedure. To background correct the captured images, processor 206 may turn off reference light source 201, capture an image using digital camera sensor 205 (referred as the background image), and store the background image in a memory (not shown). Processor 206 may then turn on reference light source 201 and capture another image using digital camera sensor 205 (referred to as the foreground image), and store the foreground image in the memory. Processor 206 may perform the background corrections by subtracting the capture background image from the capture foreground image. Processor 206 may be capable of performing the background correction in 10's of milliseconds, and therefore can be referred to as a real-time background correction (RTBC). The RTBC can be performed by processor 206 in all stages of the fiber termination process, such as prior to insertion of optical field fiber 102, at various points where optical field fiber 102 is partially inserted into fiber optic connector 109, and when optical field fiber 102 is fully inserted into fiber optic connector 109.

Referring back to FIG. 1, the scattered light from reference fiber 301 in the captured images may be used to baseline the optical intensity profile of the images. Processor 206 may analyze the scattered light images utilizing various digital signal processing algorithms to estimate insertion loss at fiber optic connector 109. Processor 206 may be a single processor or a plurality of physical and/or logical processors or processing cores. Processor 206 may be implemented by various types of processors, such as a central processing unit (CPU), a dedicated integrated circuit such as an ASIC (application-specific integrated circuit), a dedicated FPGA (field-programmable gate array), or a digital signal processor (DSP). Processor 206 may be capable of executing instructions (e.g., stored on a machine-readable storage medium not shown) that, when executed (e.g., by processor 206), implement the algorithms described herein.

In one implementation, the insertion loss algorithm may include estimating insertion loss based on the light leaked from selected regions of fiber optic connector 109. The regions may be selected based on the connector type. In one example, and referring back to FIG. 4, the regions may be region B, C, and D. Processor 206 may capture an image of fiber optic connector 109 and reference fiber 301 (via digital camera sensor 205) prior to the insertion of optical field fiber 102 into fiber optic connector 109 (ima0(x,y)) and after optical field fiber 102 has been fully inserted into fiber optic connector 109 (ima1(x,y)), where x and y represent the horizontal and vertical coordinates of the pixels in the images. In addition, the position of the reference fiber 301 in digital camera sensor 205 may be stored in a memory (e.g., during factory calibration) and accessed by processor 206. The average and maximum levels of the pixel coordinates corresponding to reference fiber 301 are stored in variables S0_ave, S0_max for ima0(x,y) and S1_ave, S1_max for ima1 (x,y).

Processor 206 may estimate the accumulated light leakage in regions B, C, and D using:

$$SumB0 = \sum_{[x \varepsilon Region\_B]} \sum_{y} ima0(x, y) \quad (1)$$

$$SumC0 = \sum_{[x \varepsilon Region\_C]} \sum_{y} ima0(x, y) \quad (2)$$

$$SumD0 = \sum_{[x \varepsilon Region\_D]} \sum_{y} ima0(x, y) \quad (3)$$

$$SumB1 = \sum_{[x \varepsilon Region\_B]} \sum_y ima1(x, y) \quad (4)$$

$$SumC1 = \sum_{[x \varepsilon Region\_C]} \sum_y ima1(x, y) \quad (5)$$

$$SumD1 = \sum_{[x \varepsilon Region\_D]} \sum_y ima1(x, y) \quad (6)$$

Where the y-regions are the vertical regions in digital camera sensor 205 that capture only fiber optic connector 109 and not reference fiber 301. Processor 206 may estimate the relative light leakage of fiber optic connector 109 from the estimated accumulated light leakage in regions B, C, and D using:

$$R_1 = \frac{SumC1}{SumD1} \quad (7)$$

$$R_2 = \frac{SumC1}{SumB1} \quad (8)$$

$$R_3 = \left(\frac{SumC1 - K_0 SumB0}{SumC0 - K_0 SumB0}\right)\frac{S0}{S1} \quad (9)$$

Where S0 and S1 are either the average or peak levels of reference fiber 301. The decision of using the average or peak levels for S0 and S1 depends on the linearity and noise of digital camera sensor 205.

Processor 206 may calculate the estimated insertion loss value at fiber optic connector 109 in dB based on the relative light leakage of fiber optic connector 109 using:

$$IL_{est} = K_1 + K_2 R_1 + K_3 R_2 + K_4 \log_{10}(1 - K_5 R3) \quad (10)$$

Where K0, K1, K2, K3, K4, and K5 are calibration constants that depend on the type of fiber optic connector 109 and the optical properties of lens 204, filter 203, and other apparatuses in the optical path. In one example, using calibration constants of K0=0.05, K1=0.02, K2=0, K3=0.02, and K4=10 may yield an estimated insertion loss accuracy of about ±0.15 dB.

In some implementations, processor 206 may tune the intensity of scattered light emanating from reference fiber 301 by adjusting the duty cycle of reference light source 201 to modulate reference light source 201. Therefore S0_max, S0_ave and S1_max, S1_ave can be modified to match the maximum or average levels of the pixels in the zone of interest. Since the power of reference light source 201 can be known for a set of duty cycles, DC, a table that relates the DC with the estimated insertion loss can be used.

In another implementation, the insertion loss algorithm may include estimating insertion loss using:

$$IL_{est} = K_1 + K_4 \frac{SumC1 - K_0 SumB1}{N\,S1_{ave}} \quad (11)$$

Where N is the total number of pixels in the sum area of digital camera sensor 205 and 51 the average level value of reference fiber 301.

In another implementation, the insertion loss algorithm may include estimating insertion loss using power tunable reference sources described above to produce a calibration table that maps exposure time to the power level of reference light source 201. The table may be generated before insertion loss estimate. During the insertion loss estimate, processor 206 executes a sensor auto exposure algorithm that changes the exposure time until it detects that there is not saturation in the image. The table may be used to convert exposure time to a factor used to estimate the insertion loss as follows:

$$IL_{est} = K_1 + K_2 R_1 + K_3 R_2 + K_4 \log_{10}(1 - f(T_{exp})K_5 SumC1 - K_0 SumB0) \quad (12)$$

Where $f(\ )$ is a function that represents the calibration table and $T_{exp}$ represents the input to the table the exposure time of the system that avoids or minimizes saturation of the image.

Processor 206 may compare the estimated insertion loss value at fiber optic connector 109 to a threshold insertion loss value. An example threshold insertion loss value may be 0.75 dB. The threshold insertion loss value may be set and adjusted by a user via input interface 212. Input interface 212 may be a keyboard, mouse, touchscreen, joystick, etc. If processor 206 determines that the estimated insertion loss value is less than the threshold insertion loss value, processor 206 may display the estimated insertion loss value along with a visual pass indicator on display 208 (and play an audio tone via speaker 210 in some implementations) indicating that optical field fiber 102 is in position and ready to be mechanically spliced with stub fiber 101. Cam 104 may then be actuated to complete the mechanical splice, thereby terminating optical field fiber 102 to fiber optic connector 109.

If processor 206 determines that the estimated insertion loss value is equal to or greater than the threshold insertion loss value, processor 206 may display the estimated insertion loss value along with a visual fail indicator on display 208 (and play an audio tone via speaker 210 in some implementations) indicating that optical field fiber 102 is not ready to be mechanically spliced with stub fiber 101. Optical field fiber 102 may then be removed from fiber optic connector 109 and reinserted so that processor 206 can re-estimate the insertion loss value.

In some implementations, processor 206 may continuously capture images and estimate the insertion loss as optical field fiber 102 is being inserted into fiber optic connector 109 until optical field fiber 102 is positioned in a location where the estimated insertion loss value is less than the threshold insertion loss value. At that point, processor 206 may display the estimated insertion loss value along with a visual pass indicator on display 208 (and play an audio tone via speaker 210 in some implementations) indicating that optical field fiber 102 is in position and ready to be mechanically spliced with stub fiber 101.

Figure 2:
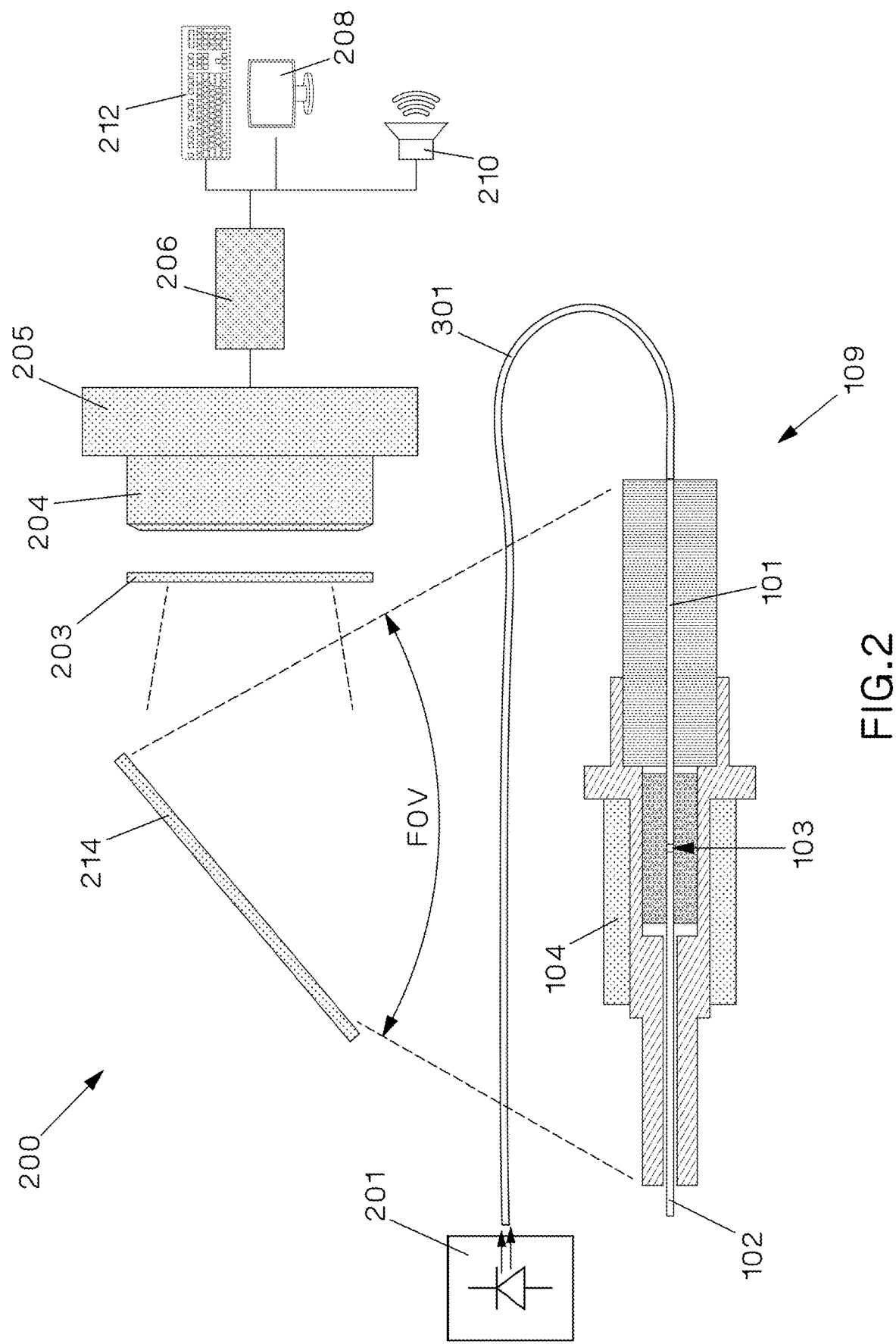
FIG. 2 is an illustration of an example implementation of an optical fiber termination system.

FIG. 2 is an illustration of an example implementation of an optical fiber termination system 200. Optical fiber termination system 200 may be similar to, and operate using the same principles as, optical fiber termination system 200. However, optical fiber termination system 200 may include an angled reflector 214 between filter 203 and fiber optic connector 109 to redirect the FOV of digital camera sensor 205 at an angle toward fiber optic connector 109 and reference fiber 301. The number and arrangement of these components is an example only and provided for purposes of illustration. Other arrangements and numbers of components may be utilized without departing from the examples of the present disclosure.

The angle may be a 90° angle as shown in FIG. 2 or any other angle. The purpose of adding angled reflector 214 is to make optical fiber termination system 200 and/or to increase the FOV of digital camera sensor 200.

Figure 3:
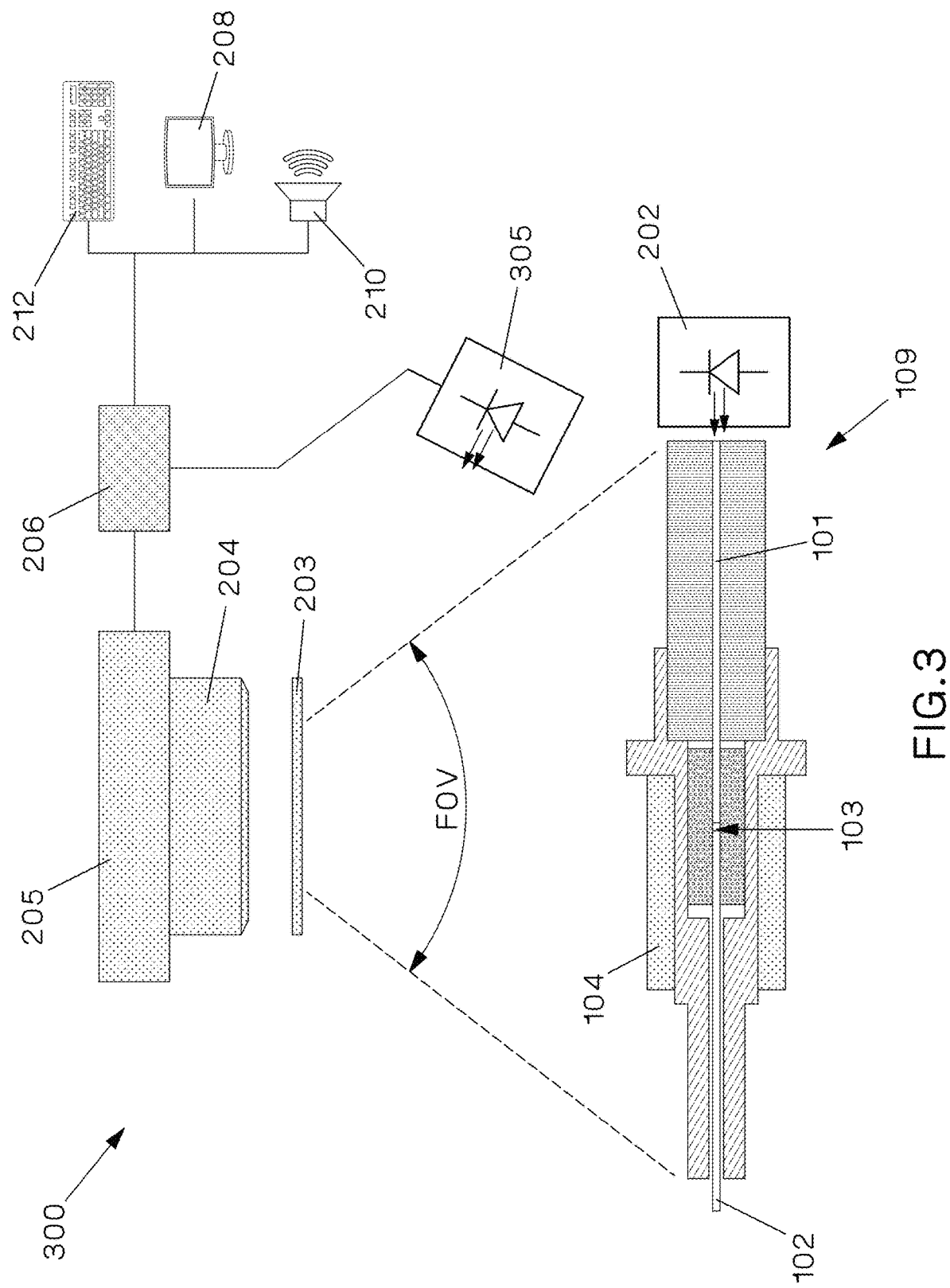
FIG. 3 is an illustration of an example implementation of an optical fiber termination system.

FIG. 3 is an illustration of an example implementation of an optical fiber termination system 300. Optical fiber termination system 300 may operate similarly to optical fiber termination system 100, except that light a reference light source 305 emits light directly into the FOV of digital camera sensor 205 instead of through a reference fiber. In addition, a connector light source 202 illuminates fiber optic connector 109. The number and arrangement of these components is an example only and provided for purposes of illustration. Other arrangements and numbers of components may be utilized without departing from the examples of the present disclosure. For example, while reference light source 305 and connector light source 202 are shown to be separate light sources in FIG. 3, these light sources may be implemented by one light source or additional light sources. As another example, connector light source 202 may be connected to a launch fiber (not shown), which may couple light from connector light source 202 to fiber optic connector 109.

Digital camera sensor 205 may capture images of scattered light emanating from a portion of fiber optic connector 109 and reference light source 305 both in the FOV of digital camera sensor 205. Processor 206 may adjust an optical intensity profile of the captured images based on an intensity of the scattered light emanating from reference light source 305, and then generate a spatial pattern of the scattered light emanating from the portion of fiber optic connector 109 and reference light source 305 in the FOV of digital camera sensor 305. Processor 206 may estimate an insertion loss value at fiber optic connector 109 based on the spatial pattern of the scattered light emanating from the portion of fiber optic connector 109 relative to the spatial pattern of the scattered light emanating from reference light source 305 using the algorithms described above.

Figure 5:
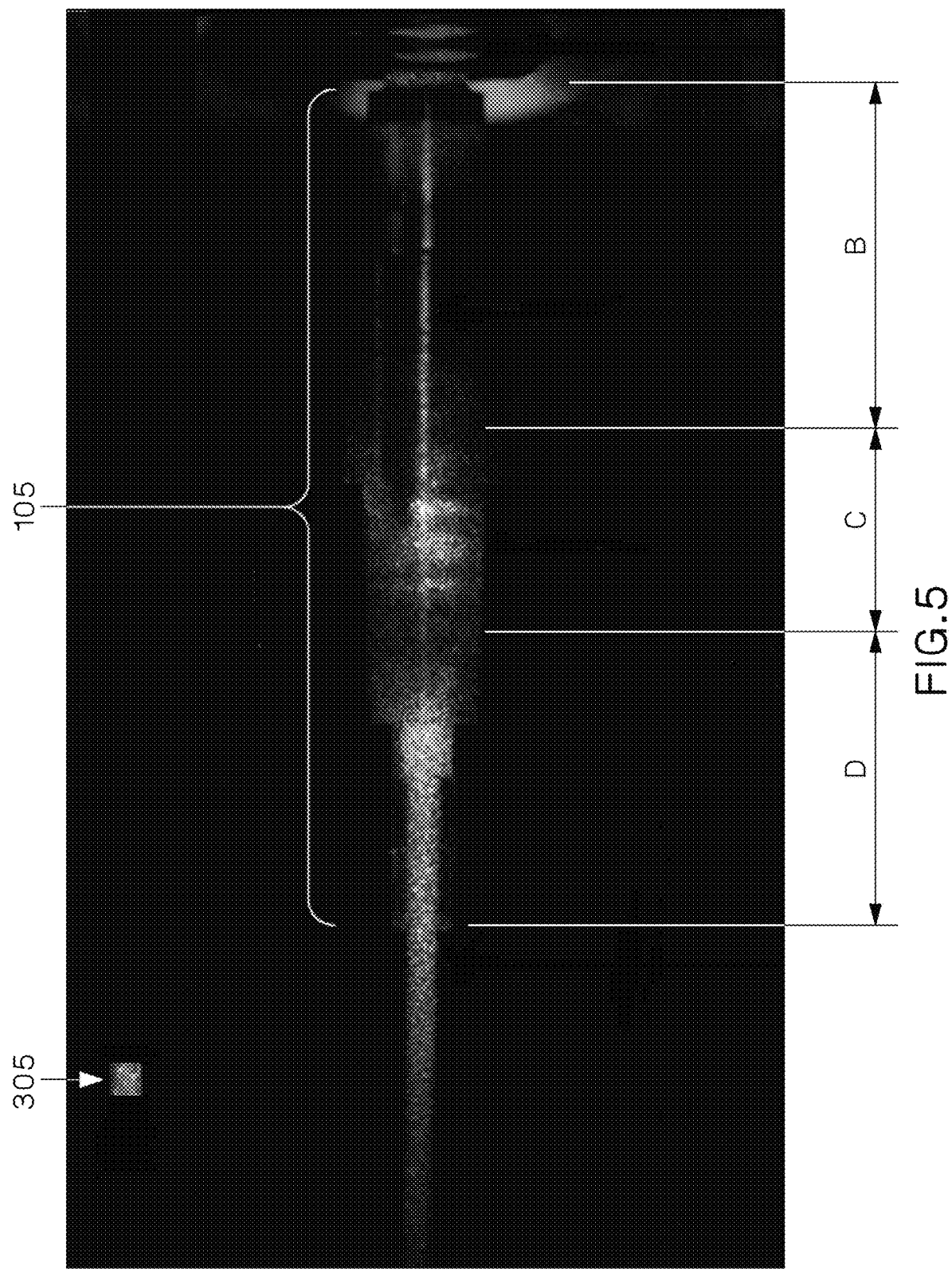
FIG. 5 is an example spatial pattern of scattered light emanating from a portion of a fiber optic connector and a portion of a reference light source.

FIG. 5 is an example of a spatial pattern of the scattered light from fiber optic connector 109 and reference light source 305. As shown in FIG. 5, regions B, C, and D of fiber optic connector 109 were captured. Moreover, as shown in FIG. 5, reference light source 305 and fiber optic connector 109 are located in the FOV of digital camera sensor 205 in such a way that there is not interference or overlap with each other.

Figure 7:
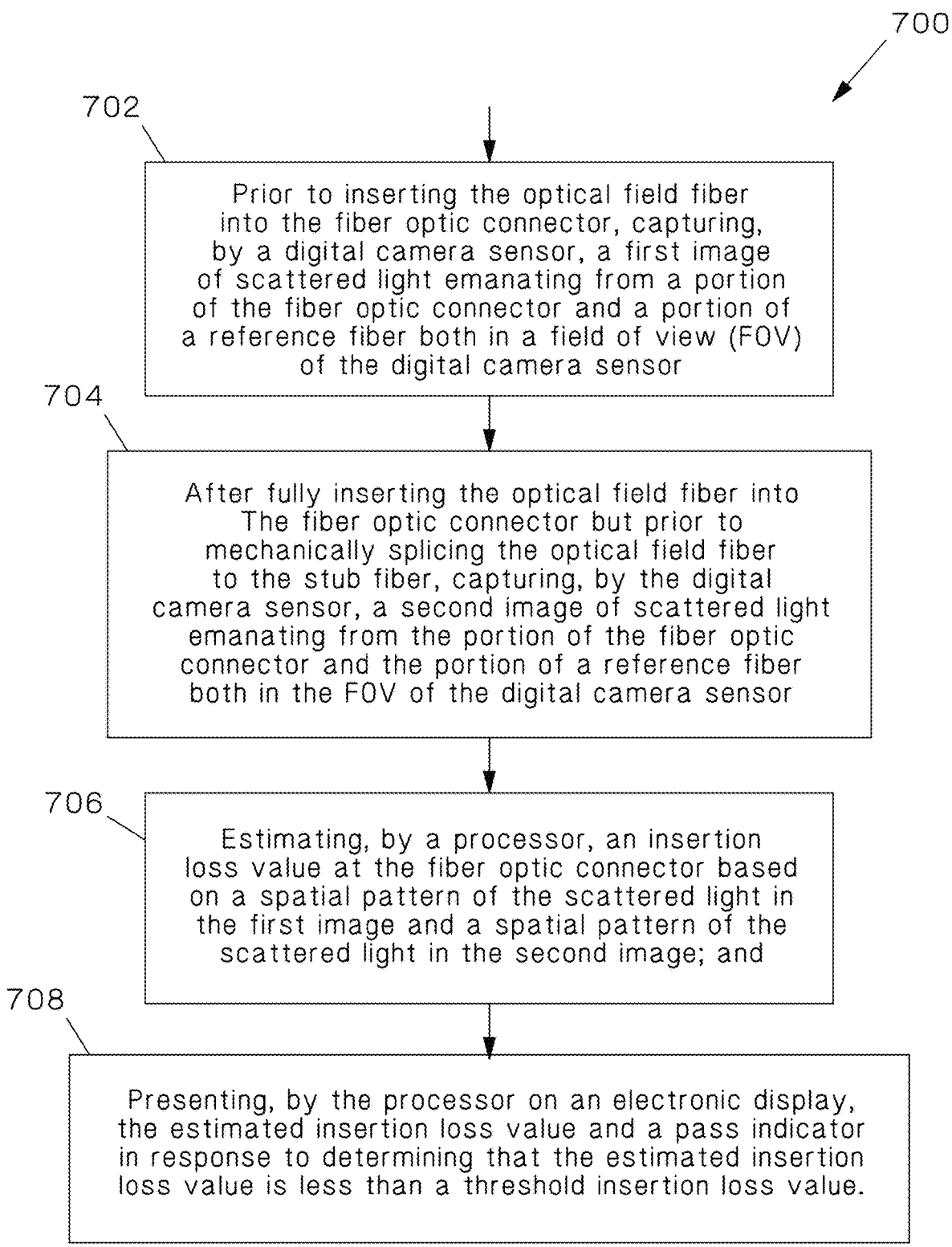
FIG. 7 is a flowchart of an example method for terminating an optical field fiber to a stub fiber in a fiber optic connector.

FIG. 7 is a flowchart depicting an example method 700 for method for terminating an optical field fiber to a stub fiber in a fiber optic connector. Method 700 may be executed or performed by some or all of the system components described above in optical fiber termination system 100 and 200 of FIGS. 1 and 2, respectively. In some implementations, steps of method 700 may be executed substantially concurrently or in a different order than shown in FIG. 7, and more or less steps may be performed than shown. In some implementations, some of the steps of method 700, or method 700 in general, may, at certain times, be ongoing and/or may repeat.

At block 702, prior to inserting an optical field fiber into a fiber optic connector, a first image of scattered light emanating from a portion of the fiber optic connector and a portion of a reference fiber both in a FOV of a digital camera sensor may be captured by the digital camera sensor.

At block 704, after fully inserting the optical field fiber into the fiber optic connector but prior to mechanically splicing the optical field fiber to the stub fiber, a second image of scattered light emanating from the portion of the fiber optic connector and the portion of a reference fiber both in the FOV of the digital camera sensor may be captured by the digital camera sensor.

At block 706, a processor connected to the digital camera sensor may estimate an insertion loss value at the fiber optic connector based on a spatial pattern of the scattered light in the first image and a spatial pattern of the scattered light in the second image. In some implementations, the insertion loss estimation may include estimating an amount of accumulated light leakage from each of a plurality of sub regions of the fiber optic connector using the spatial pattern of the scattered light in the first image and the spatial pattern of the scattered light in the second image, calculating a relative amount of light leakage from each of the plurality of sub regions based on the amount of accumulated light leakage from each of a plurality of sub regions and average or peak levels of intensity for the scattered light emanating from the portion of a reference fiber both in the FOV of the digital camera sensor, and calculating the estimated insertion loss value based on the calculated relative amount of light leakage from each of the plurality of sub regions and a plurality of calibration constants.

At block 708, the processor may present the estimated insertion loss value and a pass indicator in response to determining that the estimated insertion loss value is less than a threshold insertion loss value on an electronic display. In some implementations, method 700 may also include mechanically splicing the optical field fiber to the stub fiber using a cam in response to the processor determining that the estimated insertion loss value is less than a threshold insertion loss value.

In some implementations, method 700 may be modified to be performed by optical fiber termination system 300 of FIG. 3. For example, instead of capturing scattered light emanating from a portion of a reference fiber, method 700 may include capturing scattered light emanating from a reference light source.

Figure 8:
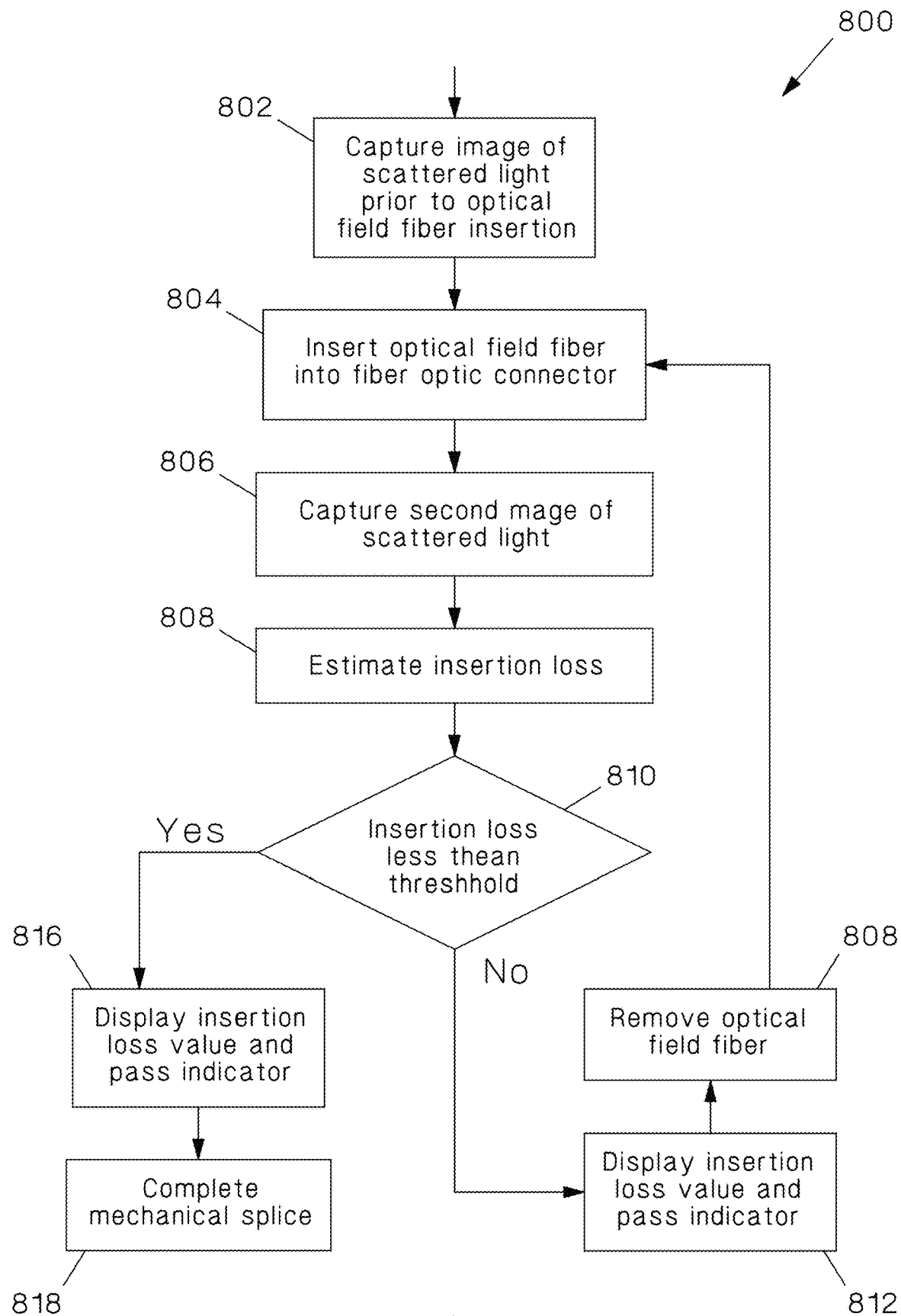
FIG. 8 is a flowchart of an example method for terminating an optical field fiber to a stub fiber in a fiber optic connector.

FIG. 8 is a flowchart depicting an example method 800 for method for terminating an optical field fiber to a stub fiber in a fiber optic connector. Method 800 may be executed or performed by some or all of the system components described above in optical fiber termination system 100 and 200 of FIGS. 1 and 2, respectively. In some implementations, steps of method 800 may be executed substantially concurrently or in a different order than shown in FIG. 8, and more or less steps may be performed than shown. In some implementations, some of the steps of method 800, or method 800 in general, may, at certain times, be ongoing and/or may repeat.

At block 802, prior to inserting an optical field fiber into a fiber optic connector, a first image of scattered light emanating from a portion of the fiber optic connector and a portion of a reference fiber both in a FOV of a digital camera sensor may be captured by the digital camera sensor.

At block 804, the optical field fiber may be fully inserted into the fiber optic connector. At block 806, after fully inserting the optical field fiber into the fiber optic connector but prior to mechanically splicing the optical field fiber to the stub fiber, a second image of scattered light emanating from the portion of the fiber optic connector and the portion of a reference fiber both in the FOV of the digital camera sensor may be captured by the digital camera sensor.

At block 808, a processor connected to the digital camera sensor may estimate an insertion loss value at the fiber optic connector based on a spatial pattern of the scattered light in the first image and a spatial pattern of the scattered light in the second image. In some implementations, the insertion loss estimation may include estimating an amount of accumulated light leakage from each of a plurality of sub regions of the fiber optic connector using the spatial pattern of the scattered light in the first image and the spatial pattern of the scattered light in the second image, calculating a relative amount of light leakage from each of the plurality of sub regions based on the amount of accumulated light leakage from each of a plurality of sub regions and average or peak levels of intensity for the scattered light emanating from the portion of a reference fiber both in the FOV of the digital camera sensor, and calculating the estimated insertion loss value based on the calculated relative amount of light leakage from each of the plurality of sub regions and a plurality of calibration constants.

At block 810, the processor may determine whether the estimated insertion loss value calculated at block 808 is less than a threshold insertion loss value. If the processor determines that the estimated insertion loss value calculated is not less than the threshold insertion loss value (810—NO), the processor, at block 812 may present the estimated insertion loss value and a visual fail indicator on an electronic display. At block 814, the optical field fiber may be removed from the fiber optic connector, and method 800 may return to block 804, where the optical field fiber is reinserted into the fiber optic connector for another insertion loss estimation.

If the processor determines that the estimated insertion loss value calculated is less than the threshold insertion loss value (810—YES), the processor, at block 816 may present the estimated insertion loss value and a visual pass indicator on the electronic display. At block 818, method 800 may include mechanically splicing the optical field fiber to the stub fiber using a cam to terminate the optical field fiber to the fiber optic connector.

In some implementations, method 800 may be modified to be performed by optical fiber termination system 300 of FIG. 3. For example, instead of capturing scattered light emanating from a portion of a reference fiber, method 800 may include capturing scattered light emanating from a reference light source.

Note that while the present disclosure includes various embodiments, these embodiments are non-limiting (regardless of whether they have been labeled as exemplary or not), and there are alterations, permutations, and equivalents, which fall within the scope of this invention. Additionally, the described embodiments should not be interpreted as mutually exclusive, and should instead be understood as potentially combinable if such combinations are permissive. It should also be noted that there are many alternative ways of implementing the embodiments of the present disclosure. It is therefore intended that claims that may follow be interpreted as including all such alterations, permutations, and equivalents as fall within the true spirit and scope of the present disclosure.

The invention claimed is:

1. A method for terminating an optical field fiber to a stub fiber in a fiber optic connector, the method comprising:

prior to inserting the optical field fiber into the fiber optic connector, capturing, by a digital camera sensor, a first image of scattered light emanating from a portion of the fiber optic connector and a portion of a reference fiber both in a field of view (FOV) of the digital camera sensor;

after fully inserting the optical field fiber into the fiber optic connector but prior to mechanically splicing the optical field fiber to the stub fiber, capturing, by the digital camera sensor, a second image of scattered light emanating from the portion of the fiber optic connector and the portion of a reference fiber both in the FOV of the digital camera sensor;

estimating, by a processor, an insertion loss value at the fiber optic connector based on a spatial pattern of the scattered light in the first image and a spatial pattern of the scattered light in the second image; and presenting, by the processor on an electronic display, the estimated insertion loss value and a pass indicator in response to determining that the estimated insertion loss value is less than a threshold insertion loss value wherein estimating the insertion loss value at the fiber optic connector comprises:

estimating an amount of accumulated light leakage from each of a plurality of sub regions of the fiber optic connector using the spatial pattern of the scattered light in the first image and the spatial pattern of the scattered light in the second image;

calculating a relative amount of light leakage from each of the plurality of sub regions based on the amount of accumulated light leakage from each of a plurality of sub regions and average or peak levels of intensity for the shattered light emanating from the portion of a reference fiber both in the FOV of the digital camera sensor; and calculating the estimated insertion loss value based on the calculated relative amount of light leakage from each of the plurality of sub regions and a plurality of calibration constants.

2. The method of claim 1, wherein the plurality of calibration constants is selected based on a connector type of the fiber optic connector.

3. The method of claim 2, wherein the connector type of the fiber optic connector is one of an LC, SC, and ST connector.

4. The method of claim 1, comprising:

mechanically splicing the optical field fiber to the stub fiber in response to determining that the estimated insertion loss value is less than a threshold insertion loss value.

5. The method of claim 4, comprising:

mechanically splicing the optical field fiber to the stub fiber using a cam.

* * * * *